US012626034B2

(12) United States Patent
Kim et al.

(10) Patent No.: US 12,626,034 B2
(45) Date of Patent: May 12, 2026

(54) DIGITAL TWIN BASED TEMPERATURE DISTRIBUTION ESTIMATING METHOD AND TEMPERATURE DISTRIBUTION ESTIMATING APPARATUS

(71) Applicant: UNIVERSITY-INDUSTRY COOPERATION GROUP OF KYUNG HEE UNIVERSITY, Yongin-si (KR)

(72) Inventors: Jin Gyun Kim, Suwon-si (KR); Chang Uk Ahn, Suwon-si (KR); Ji Won Lee, Jeonju-si (KR); In Chan Beck, Suwon-si (KR); Do Hyeong Kwon, Suwon-si (KR)

(73) Assignee: UNIVERSITY-INDUSTRY CORPORATION GROUP OF KYUNG HEE UNIVERSITY, Yongin-si (KR)

( * ) Notice: Subject to any disclaimer, the term of this patent is extended or adjusted under 35 U.S.C. 154(b) by 1060 days.

(21) Appl. No.: 17/670,050

(22) Filed: Feb. 11, 2022

(65) Prior Publication Data

US 2022/0398359 A1     Dec. 15, 2022

(30) Foreign Application Priority Data

Jun. 10, 2021     (KR) ........................ 10-2021-0075546

(51) Int. Cl.
*G06F 30/20* (2020.01)
*G06F 111/10* (2020.01)
(Continued)

(52) U.S. Cl.
CPC .......... *G06F 30/20* (2020.01); *G06F 2111/10* (2020.01); *G06F 2119/08* (2020.01); *G06F 2119/18* (2020.01)

(58) Field of Classification Search
CPC .. G06F 30/20; G06F 2119/08; G06F 2119/18; G06F 2111/10
(Continued)

(56) References Cited

U.S. PATENT DOCUMENTS 11,024,522 B2     6/2021   Mungekar et al.

FOREIGN PATENT DOCUMENTS

KR          20210000731 A       1/2021
WO      WO-2006118899 A1 * 11/2006   ........... G01D 18/008

OTHER PUBLICATIONS

Valdez_1998 (Improving Vertical Furnace Performance Using Model-Based Temperature Control, AEC/APC Symposium X, Oct. 11-14, 1998; Vail, Colorado) (Year: 1998).*
(Continued)

*Primary Examiner* — Brian S Cook
(74) *Attorney, Agent, or Firm* — WOMBLE BOND DICKINSON (US) LLP

(57)          ABSTRACT

The temperature distribution estimating method of the disclosure includes a building operation to build a numerical model for a form and thermal behavior of a substrate; a setting operation to set a regularization parameter to adjust noises of a temperature of the substrate measured by a temperature sensor; a generating operation to generate a sensitivity coefficient matrix that estimates a heat source received by the substrate from a plurality of heaters; a condensing operation to condense the sensitivity coefficient matrix based on a power ratio input in the heaters respectively; and estimating operation to estimate an entire temperature distribution of the substrate based on the numerical model, the regularization parameter, and the condensed sensitivity coefficient matrix, when predetermined temperature data are input.

6 Claims, 4 Drawing Sheets

(51) Int. Cl.
    *G06F 119/08*      (2020.01)
    *G06F 119/18*      (2020.01)

(58) Field of Classification Search
    USPC ............................................................ 703/2
    See application file for complete search history.

(56)             References Cited

OTHER PUBLICATIONS

Kim_1999 (Theoretical analysis of wafter temperature dynamics in a low pressure chemical vapor deposition reactor, International Journal of Heat and Mass Transfer 42 (1999) 4131-4142) (Year: 1999).*
Malinaric_2004 (Contribution to the Sensitivity Coefficients Analysis in the Extended Dynamic Plane Source (EDPS) Method, International Journal of Thermophysics, vol. 25, No. 6, Nov. 2004 (Year: 2004).*
Hou_2003 (Sensitivity Equation Derivation for Transient Heat Transfer Problems, NASA Langley Research Center Jan. 1, 2004). (Year: 2004).*

* cited by examiner

FIG. 1

Lamp

Chamber

Substrate(Wafer)

Temperature Sensor
(Thermocouple)

Temperature Sensor
(Pyrometer, Radiometer)

1

DIGITAL TWIN BASED TEMPERATURE DISTRIBUTION ESTIMATING METHOD AND TEMPERATURE DISTRIBUTION ESTIMATING APPARATUS

CROSS-REFERENCE TO RELATED APPLICATION

This application claims the benefit under 35 U.S.C. § 119 of Korean Patent Application No. 10-2021-0075546 filed on Jun. 10, 2021, in the Korean Intellectual Property Office, the entire disclosure of which is incorporated herein by reference for all purposes.

BACKGROUND

1. Field

The following description relates to a temperature distribution estimating method and a temperature distribution estimating apparatus during a rapid thermal processing when manufacturing a semiconductor device, more specifically, a temperature distribution estimating method and a temperature distribution estimating apparatus that are able to estimate a temperature distribution of a wafer only by small data of a point measurement temperature.

2. Description of Related Art

In manufacturing a semiconductor device, a temperature of a wafer is rapidly increased in a rapid thermal processing (hereinafter, 'RTP'). In this case, when a temperature distribution of a wafer is not maintained uniformly, there may be problems such as a warpage, crack, and dislocation, etc. Therefore, it is important to maintain a temperature distribution uniformly in a RTP operation, and accordingly, a temperature distribution measurement technology for a wafer is desired.

A contact temperature sensor, thermocouple, and a non-contact temperature sensor, pyrometer are mainly used to measure a temperature of a wafer. In measuring a temperature with a thermocouple, numerous sensors are needed to measure the entire temperature of a wafer, which may cause an error due to increasing a thermal resistance of the thermocouple. Also, the error may become larger by keeping using it.

Therefore, measuring a temperature with using a pyrometer is the main method in a typical RTP apparatus. In measuring the entire temperature distribution with a pyrometer, an amount of photons is measured from a point or points of a wafer. However, since a temperature is changed dramatically in a wafer during a RTP operation, an emissivity of an object may be changed. This makes it difficult to precisely measure a temperature with using a pyrometer.

The reason why a pyrometer is mainly used to measure a temperature of a RTP apparatus even though it is relatively expensive compared with a thermocouple is that a thermocouple needs a number of sensors to measure a temperature. Therefore, a production cost may rise with when using a thermocouple in a mass production of semiconductor devices.

Consequently, it is really difficult to measure the entire temperature distribution of a wafer only with current hardware apparatus, and it leads to another problem to calculate a uniformity of a wafer. A calculation formula for a thin film uniformity may vary according to an apparatus or a company, but the calculation is conducted mainly by using max/min value such as (max−min)/(2*avg) and (max−min)/(max+min) because measuring data are not enough. When measuring data are enough, a precise calculation for a uniformity may be possible by calculating a standard deviation of a space.

Korean Patent Publication No. 10-2021-0000731 (Title: Virtual sensor for spatially resolved wafer temperature control, Applicant: Applied Materials, Inc.) relates to methods and apparatus for temperature sensing and control during substrate processing. To solve a technical issue that it is difficult to measure a substrate temperature directly during a substrate processing, the publication establishes models to estimate a temperature change of a substrate according to changes in power output by building models via machine learning techniques, and the models are used to adjust heating device setpoints for future processing operations.

However, the invention disclosed in Korean Patent Publication No. 10-2021-0000731 has two problems. One is that massive data are needed before establishing models. The other is that maintaining heating device setpoints do not guarantee maintaining a substrate temperature at a target substrate temperature because a change in a heat transfer may occur between a substrate and a chamber due to a deterioration of a process chamber as time goes by.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a temperature distribution estimating method may include a building operation to build a numerical model for a form and thermal behavior of a thermal processing target substrate; a setting operation to set a regularization parameter to adjust noises of a temperature of the substrate measured by a temperature sensor; a generating operation to generate a sensitivity coefficient matrix that estimates a heat source received by the substrate from a plurality of heaters; a condensing operation to condense the sensitivity coefficient matrix based on a power ratio input in the heaters respectively; and estimating operation to estimate an entire temperature distribution of the substrate based on the numerical model, the regularization parameter, and the condensed sensitivity coefficient matrix, when predetermined temperature data are input.

The condensing operation may include a heater controllers' calculating power ratio information of each heater; and condensing the sensitivity coefficient matrix by receiving the power ratio information from the heater controller.

The estimating operation may only calculate some of heat sources among a plurality of heaters and restore the rest of heat sources based on a condensed sensitivity coefficient matrix.

The method may further include a monitoring operation to compare an entire temperature distribution estimated by using the predetermined temperature data that are measured in the temperature sensor with temperature data measured by using a temperature sensor for verification in real time.

The setting operation may include setting a first regularization parameter based on temperature data in a first test operation; calculating a correction value of a regularization parameter in a predetermined cycle based on temperature data saved in a memory during a thermal processing; and setting the correction value as the regularization parameter.

Meanwhile, a temperature distribution estimating apparatus may include a plurality of heaters to supply a heat source to a thermal processing target substrate; a temperature sensor unit to measure a temperature of the substrate that is changed by the plurality of heaters; and a calculation unit to estimate an entire temperature distribution of the substrate when predetermined temperature data are input from the temperature sensor unit, wherein the calculation unit includes a numerical model building unit to build a numerical model for a form and thermal behavior of the substrate; a parameter setting unit to set a regularization parameter to adjust noises of a temperature of the substrate measured by the temperature sensor unit; a matrix generating unit to generate a sensitivity coefficient matrix to estimate a heat source received by the substrate from the plurality of heaters and to condense the sensitivity coefficient matrix based on a power ratio respectively input in the heaters; and an estimating unit to estimate an entire temperature distribution of the substrate based on the numerical model, the regularization parameter, and the condensed sensitivity coefficient matrix, when predetermined temperature data are input.

The apparatus may further include a heater controller to respectively calculate power ratio information of the plurality of heaters, wherein the matrix generating unit may condense the sensitivity coefficient matrix by receiving the power ratio information from the heater controller.

The estimating unit may only calculate some of heat sources among a plurality of heaters and restore the rest of heat sources based on a condensed sensitivity coefficient matrix.

The temperature sensor unit may include a temperature sensor for measurement and a temperature sensor for verification, wherein a monitoring unit may be further included to compare an entire temperature distribution estimated by using the predetermined temperature data that are measured in the temperature sensor for measurement with temperature data measured by using the temperature sensor for verification in real time.

The parameter setting unit may set a first regularization parameter based on temperature data in a first test operation, calculate a correction value of a regularization parameter in a predetermined cycle based on temperature data saved in a memory during a thermal processing, and set the correction value as the regularization parameter.

Other features and aspects will be apparent from the following detailed description, the drawings, and the claims.

BRIEF DESCRIPTION OF THE DRAWINGS

FIG. 1 is a schematic diagram of a rapid thermal processing apparatus for manufacturing a semiconductor device.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2:
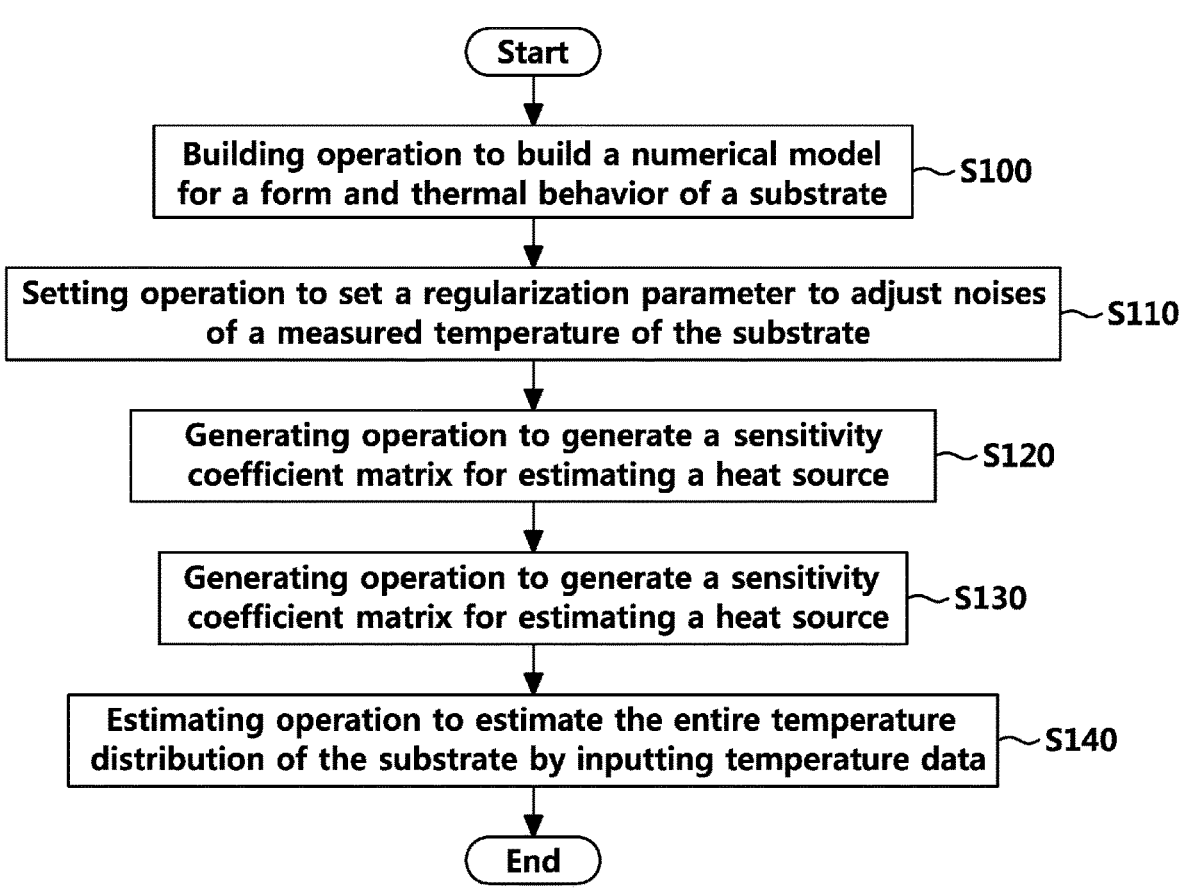
FIG. 2 is a flow chart illustrating a temperature distribution estimating method according to the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features of the examples described herein may be combined in various ways as will be apparent after an understanding of the disclosure of this application. Further, although the examples described herein have a variety of configurations, other configurations are possible as will be apparent after an understanding of the disclosure of this application.

The disclosure is to solve the above-identified problems, and the objective of the disclosure is to provide a temperature distribution estimating method and system by processing a small amount of temperature data of a point measurement temperature. Specifically, the disclosure introduces a digital twin to solve the above-identified problems. The digital twin in the disclosure is a technology that estimates all, unmeasured physical phenomena of an actual structure by forming a virtual numerical model showing a physical behavior and a physical response of a structure that is same with an actual structure and by applying some data measured by a measuring device to a pre-built, virtual numerical model.

Figure 1:
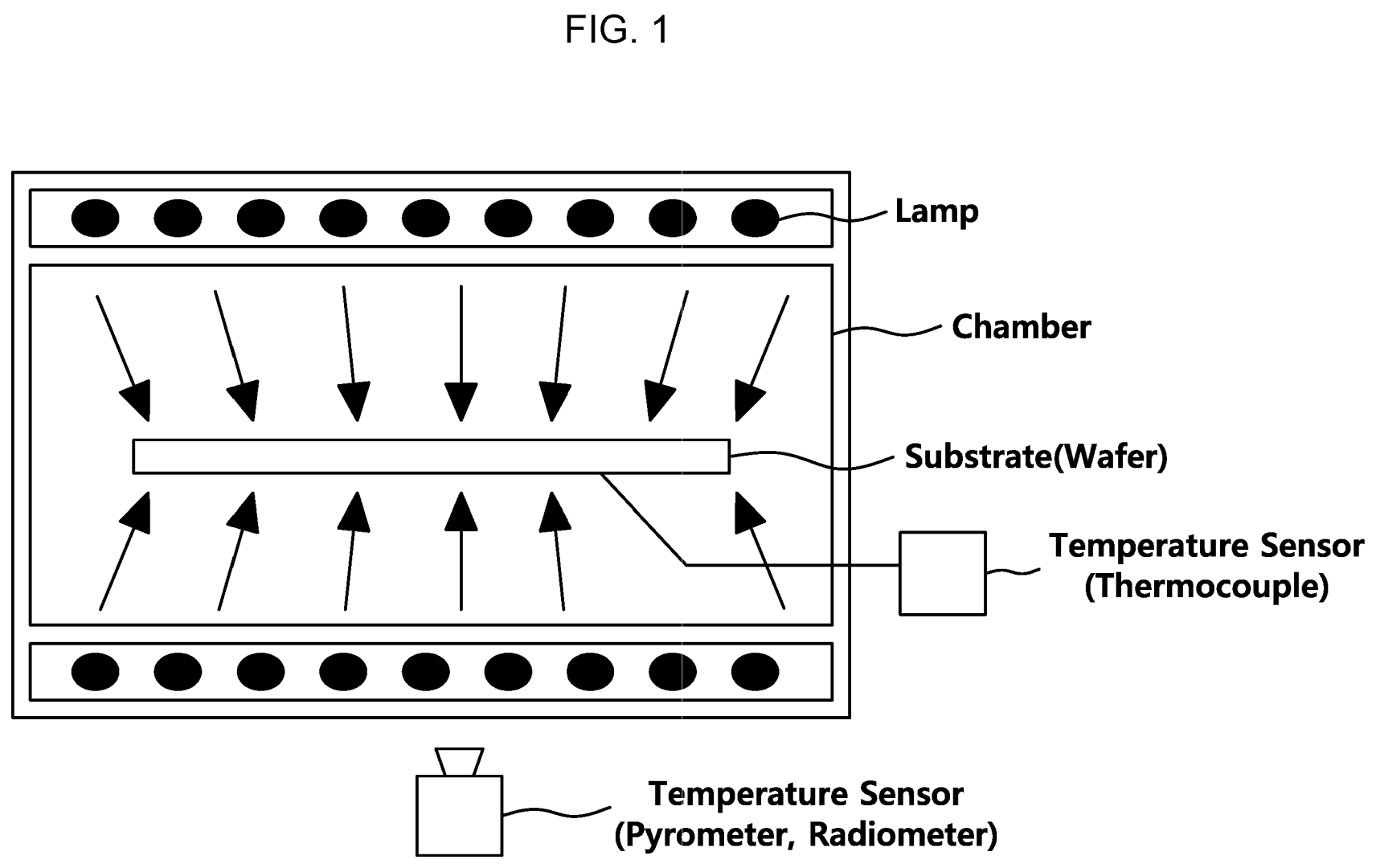

FIG. 1 is a schematic diagram of a rapid thermal processing apparatus for manufacturing a semiconductor device. As illustrated in FIG. 1, a RTP is performed inside a vacuum chamber. By using a halogen lamp or tungsten halogen lamp instead of a heater, an infrared radiant light is produced, and a laser beam is collected on a condensing lens and injected to a wafer in an instant. Compared with a thermal processing using a furnace, a RTP may perform a thermal processing of a wafer very rapidly, and it is easy to control a process and a surrounding environment.

A temperature measurement is conducted by measuring a temperature inside a furnace in a thermal processing using a furnace. However, in a RTP, a temperature of a wafer surface is directly measured. In this case, as illustrated in FIG. 1, a contact temperature sensor, thermocouple or a non-contact temperature sensor, pyrometer, etc. may be used to measure a temperature of a wafer.

FIG. 2 is a flow chart illustrating a temperature distribution estimating method according to the disclosure. As illustrated in FIG. 2, a temperature distribution estimating method of the disclosure may include a building operation S100 to build a numerical model, a setting operation S110 to set a regularization parameter, a generating operation S120 to generate a sensitivity coefficient matrix for estimating a heat source, a condensing operation S130 to condense the sensitivity coefficient matrix based on a power ratio, and an estimating operation S140 to estimate the entire temperature distribution of the substrate by inputting temperature data.

First, the heat source and the entire temperature distribution may be calculated by Formula 1 below.

$$\Delta t = t^{i+1} - t^i, \qquad \text{Formula 1}$$

$$\Delta q^{i+1} = \left[ \left( X_s^{i+1} \right)^T \left( X_s^{i+1} \right) + \alpha I \right]^{-1} \left( X_s^{i+1} \right)^T \left( Y^{i+1} - T_s^{i+1} \right),$$

$$q^{i+1} = q^i + \Delta q^{i+1},$$

$$T^{i+1} = T^i + X^{i+1} \Delta q^{i+1}$$

In this example, $t^i$ refers to a past time, $t^{i+1}$ refers to a present time, $\Delta t$ is an interval of measurement, $q^{i+1}$ refers to an estimated heat source vector, $Y^{i+1}$ refers to a measured temperature vector, and $T^{i+1}$ refers to an estimated entire temperature vector, including temperatures of other points where there is no temperature sensor. Additionally, $$T_s^{i+1}$$

refers to a virtual temperature vector of a point having a temperature sensor when $$T_s^i$$

is consistently heated by $q^i$, and it becomes a constant when there is one temperature sensor.

$$X_s^{i+1}$$

is a sensitivity coefficient matrix of a sensor location, and it is defined by Formula 2 below.

$$X_s^{i+1} = \frac{\partial T_s^{i+1}}{\partial q} = \begin{bmatrix} \dfrac{\partial T_1^{i+1}}{\partial q_1} & \dfrac{\partial T_1^{i+1}}{\partial q_2} & \cdots & \dfrac{\partial T_1^{i+1}}{\partial q_M} \\ \dfrac{\partial T_2^{i+1}}{\partial q_1} & \dfrac{\partial T_2^{i+1}}{\partial q_2} & \cdots & \dfrac{\partial T_2^{i+1}}{\partial q_M} \\ \vdots & \vdots & \ddots & \vdots \\ \dfrac{\partial T_N^{i+1}}{\partial q_1} & \dfrac{\partial T_N^{i+1}}{\partial q_2} & \cdots & \dfrac{\partial T_N^{i+1}}{\partial q_M} \end{bmatrix} \qquad \text{Formula 2}$$

Herein, N corresponds to the number of respectively used sensors, and M corresponds to the number of spatially disassembled heaters. In one example, when 3 sensors and 100 heaters are used, $$X_s^{i+1}$$

is a matrix of 3×100. $X^{i+1}$ is defined in the same way, and the number of columns is identically M, but the number of rows is identical with the entire degree of freedom of a numerical model, which will be described later. For example, when a degree of freedom of a numerical model in a wafer that is built in the building operation of a numerical model is 100, $X^{i+1}$ is a matrix of 100×100.

Each operation of a temperature distribution estimating method of the disclosure is described in detail.

First of all, a heat transfer model to express a thermal behavior of a wafer is desired to be built, and in the building operation S100 to build a numerical model, a numerical model may be built for a form and thermal behavior of a substrate. Since a wafer processed by RTP is usually a thin film, 2D numerical model building may be appropriate, but it is not limited thereto.

Various technology such as a finite element method, finite difference method, and boundary element method, etc. may be used to build a numerical model.

A numerical analysis method conducts a modeling mathematically for a law and a condition that dominates a phenomenon, expresses a solution in a combination of interpolation functions to obtain an approximate solution, and calculates each basis function. In this case, a mathematical illustration is generally converted into a matrix equation to calculate a coefficient of a basis function. A type of a numerical analysis method may be determined based on a method to define a basis function.

In one example, to define a basis function systematically, a finite element method may perform a numerical analysis by dividing a spatial region of a target object, that is, a wafer into small regions called finite elements.

A finite difference method performs a numerical integration for a differential equation inside a geometric region that is a target of a natural phenomenon to induce a matrix equation. Finite dots generated inside a geometric region are called grids, and an accuracy of an approximate solution is improved according to a density of grids.

A boundary element method performs integral calculation to a multiple of a differential equation with a kernel function called a green function for the entire region of a target object. After that, according to a green theorem, an integration for the entire region is converted into a boundary integral format based on a boundary of an object. A numerical analysis is conducted by applying a boundary condition.

The building operation S100 to build a numerical model may use various numerical analysis methods except for the above-identified methods, and the disclosure is not limited by a specific numerical analysis method.

The setting operation S110 to set a regularization parameter may set a regularization parameter to adjust noises of a temperature of the substrate measured by a temperature sensor. In the above Formula 1, $\alpha$ is a parameter to improve a stability. A regularization parameter may be desired to guarantee a stability against noises of a temperature sensor used in a system. That is, $\alpha$ value, a regularization parameter, may be determined by the number of sensors, their location, a thermal diffusivity of a wafer, and a performance of a chamber. Since the value may play a role to suppress an instability of Formula 1 due to a measurement error by giving a penalty, an appropriate value is desired to be input.

A method to set $\alpha$ value is as follows. ① collecting temperature information based on time of a wafer that is processed for one cycle when manufacturing an initial apparatus, ② converting the collected temperature into filtering data with removed noises by filtering the temperature through a post-processing, and ③ determining $\alpha$ value that makes the filtering data and a least square error minimum by changing $\alpha$ in the above Formula 1.

Since $\alpha$ is determined by performances of a sensor and a chamber, preparing a deterioration of an apparatus is desired because measured noise increases as an apparatus is deteriorated. Therefore, when an apparatus is being operated, temperature data (information) of a certain cycle may be collected in a memory of a calculation device, and an amount of increased noise may be observed. In this case, the amount of increased noise may be observed by using a method such as a generalized cross validation, etc., and correcting α value may be performed with the method based on the amount of increased noise. By an automatic correction of a regularization, anyone may use, maintain, and manage an apparatus easily. Shortly, an automatic correction method of a regularization is as follows: ① setting a first regularization parameter based on temperature data during a first test operation, ② calculating a correction value of a regularization parameter in a predetermined cycle based on temperature data saved in a memory during a thermal processing, and ③ setting the correction value as the regularization parameter.

The generating operation S120 to generate a sensitivity coefficient matrix may estimate a heat source received by the substrate from a plurality of heaters. In the generating operation S120 to generate a sensitivity coefficient matrix, $X^{i+1}$ and $$X_s^{i+1}$$

of the above Formula 2 are received.

$$X_s^{i+1}$$

is used to calculate a heat source that arrives at a wafer from a heater, and the entire temperature distribution may be estimated with the calculated heat source and $X^{i+1}$.

To make sure that the estimated entire temperature distribution is the only one, numbers of columns and rows of $X^{i+1}$ are identical, or the number of rows is larger than the number of columns. That indicates the number of sensors should be larger than the number of heaters. Since spatially disassembled heaters are generally more than sensors, a method to guarantee the above-identified condition is desired. Otherwise, it becomes mathematically ill-posed problem, and there may be several solutions, not only one. The disclosure may solve the problem through the condensing operation S130 to condense the sensitivity coefficient matrix.

In the condensing operation S130 to condense the sensitivity coefficient matrix, the sensitivity coefficient matrix may be condensed based on power ratio information input in each heater. With using the power ratio input in each heater, Formula 2 may be rewritten in Formula 3 below.

$$X_s^{i+1} = \begin{bmatrix} X_{s1}^{i+1} X_{s2}^{i+1} & \dots & X_{sM}^{i+1} \end{bmatrix} \qquad \text{Formula 3}$$

$$\tilde{X}_s^{i+1} = \frac{q_1}{q_1} X_{s1}^{i+1} + \frac{q_2}{q_1} X_{s2}^{i+1} + \dots + \frac{q_M}{q_1} X_{sM}^{i+1}$$

Herein, $$\tilde{X}_s^{i+1}$$

refers to a sensitivity coefficient matrix vector condensed with using a power ratio. In one example, it becomes 3×1 vector when using 3 sensors. Since the number of rows is larger than the number of columns, the only one solution may be guaranteed, and the problem mentioned above may be solved accordingly. A heat source of a first heater is only calculated in Formula 3, but other heat sources of the rest of heaters may be restored by using a power ratio. That is, through a condensing configuration of the sensitivity coefficient matrix, the disclosure may restore multiple heat sources only with small temperature data obtained from only one temperature sensor.

Therefore, the condensing operation S130 to condense the sensitivity coefficient matrix may include an operation that a heater controller calculates power ratio information of each heater. Based on the power ration information calculated by the heat controller, the condensed sensitivity coefficient matrix may be drawn as above.

In the estimating operation S140 to estimate the entire temperature distribution, when predetermined temperature data are input, the entire temperature distribution of a substrate may be estimated based on the numerical model, the regularization parameter, and the condensed sensitivity coefficient matrix. Specifically, some of heat sources may be only calculated among a plurality of heaters, and the rest of heat sources may be restored based on the condensed sensitivity coefficient matrix. Accordingly, the entire temperature distribution may be obtained.

Figure 3:
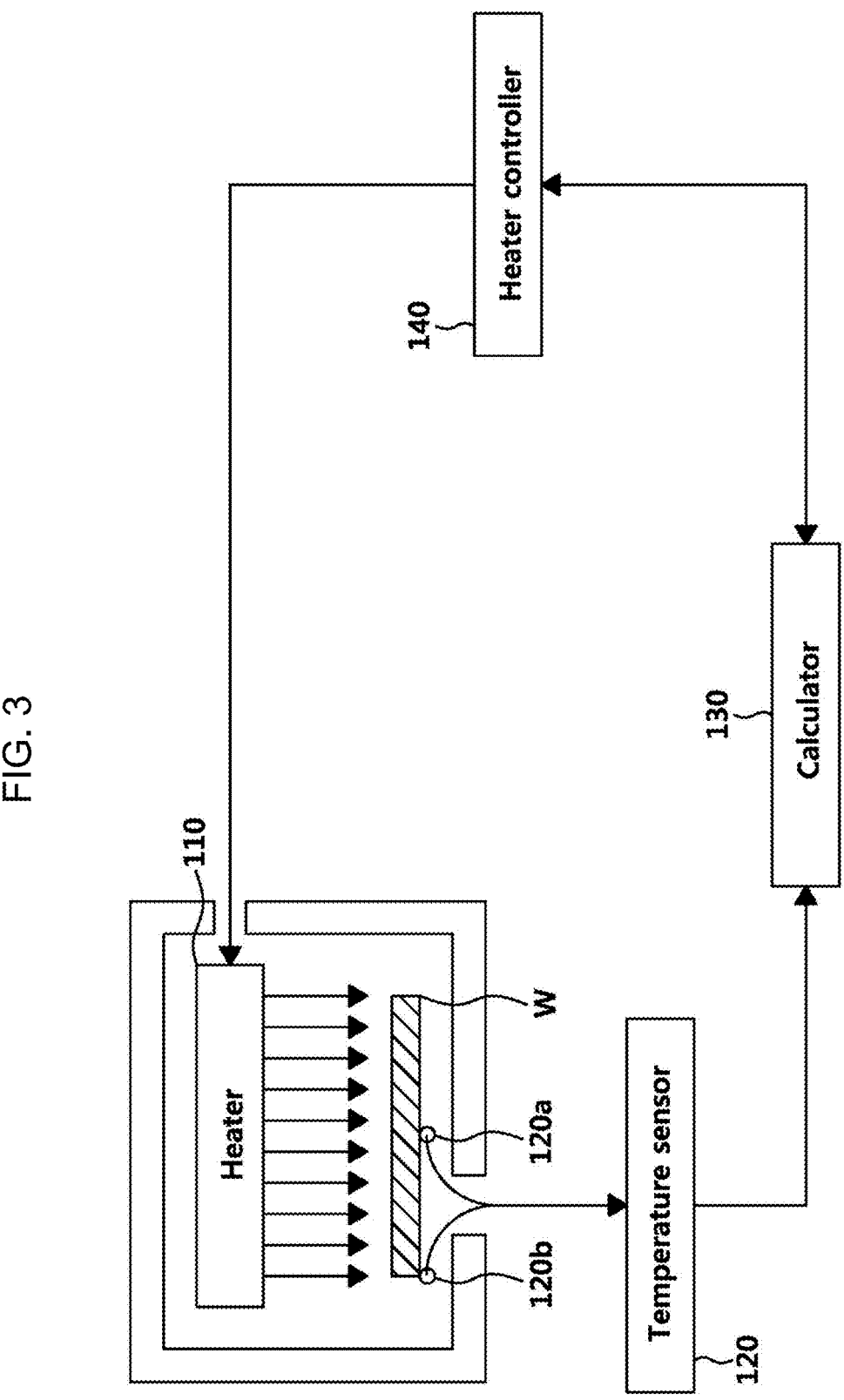
FIG. 3 is a schematic diagram of a temperature distribution estimating apparatus according to the disclosure.

FIG. 3 is a schematic diagram of a temperature distribution estimating apparatus according to the disclosure. As illustrated in FIG. 3, a temperature distribution estimating apparatus of the disclosure may include a heater 110, a temperature sensor unit 120, a calculation unit 130, and a heater controller 140.

The heater 110 may supply a heat source to a thermal processing target substrate (W). The heater 110 may be plural and may be embodied as a halogen lamp or tungsten halogen lamp, etc. generating an infrared radiant light, but it is not limited thereto.

The temperature sensor unit 120 may measure a temperature of the substrate (W) changed by the plurality of heaters 110. The temperature sensor unit 120 may include a temperature sensor for measurement 120a and a temperature sensor for verification 120b. The temperature sensor for measurement 120a and the temperature sensor for verification 120b may use various temperature sensor either contact or non-contact.

The calculation unit 130 may estimate the entire temperature distribution of the substrate when predetermined temperature data are input from the temperature sensor unit 120. The calculation unit 130 may include a numerical model building unit, a parameter setting unit, a matrix generating unit, and an estimating unit. Each configuration merely represents different functions of the calculation unit 130, and it does not indicate that the configurations should be physically separated.

The numerical model building unit may build a numerical model for a form and thermal behavior of a substrate. A related description is identical to the description for the building operation S100 to build a numerical model in a temperature distribution estimating method, and therefore, a repeated description is omitted.

The parameter setting unit may set M value in Formula 2, which is a regularization parameter to adjust noises of a temperature of the substrate measured by the temperature sensor unit. A related description is identical to the description for setting operation S110 to set a regularization parameter in a temperature distribution estimating method, and therefore, a repeated description is omitted.

The matrix generating unit may generate a sensitivity coefficient matrix that estimates a heat source received by the substrate from a plurality of heaters and may condense the sensitivity coefficient matrix based on a power ratio input in each heater. A related description is identical to the descriptions for the generating operation S120 to generate a sensitivity coefficient matrix and the condensing operation S130 to condense the sensitivity coefficient matrix in a temperature distribution estimating method, and therefore, a repeated description is omitted.

The estimating unit may estimate the entire temperature distribution of the substrate based on the numerical model built by the numerical model building unit, the regularization parameter set in the parameter setting unit, and the condensed sensitivity coefficient matrix generated in the matrix generating unit. A related description is identical to the description for the estimating operation S140 to estimate the entire temperature distribution of the substrate in a temperature distribution estimating method, and therefore, a repeated description is omitted.

Meanwhile, the heater controller 140 may calculate each power ratio information of the plurality of heaters that is a basis to generate the condensed sensitivity coefficient matrix. Accordingly, the matrix generating unit may draw the only one solution for estimating the entire temperature distribution even with relatively fewer temperature sensors compared with heaters.

That is, when a heat source or some of heat sources among the plurality of heaters is calculated, the rest of the heaters may be restored based on the condensed sensitivity coefficient matrix.

Meanwhile, a monitoring unit may be further included that compares the entire temperature distribute which is estimated by using predetermined temperature data measured by the temperature sensor for measurement 120a with measured temperature data by using the temperature sensor for verification 120b in real time.

According to a temperature distribution estimate apparatus of the disclosure, estimating the entire temperature distribution may be possible with only one sensor regardless of a pyrometer or thermocouple, and an accuracy may be adjusted by changing the number of sensors. That is, when the number of sensors becomes large, an accuracy may be improved.

Figure 4:
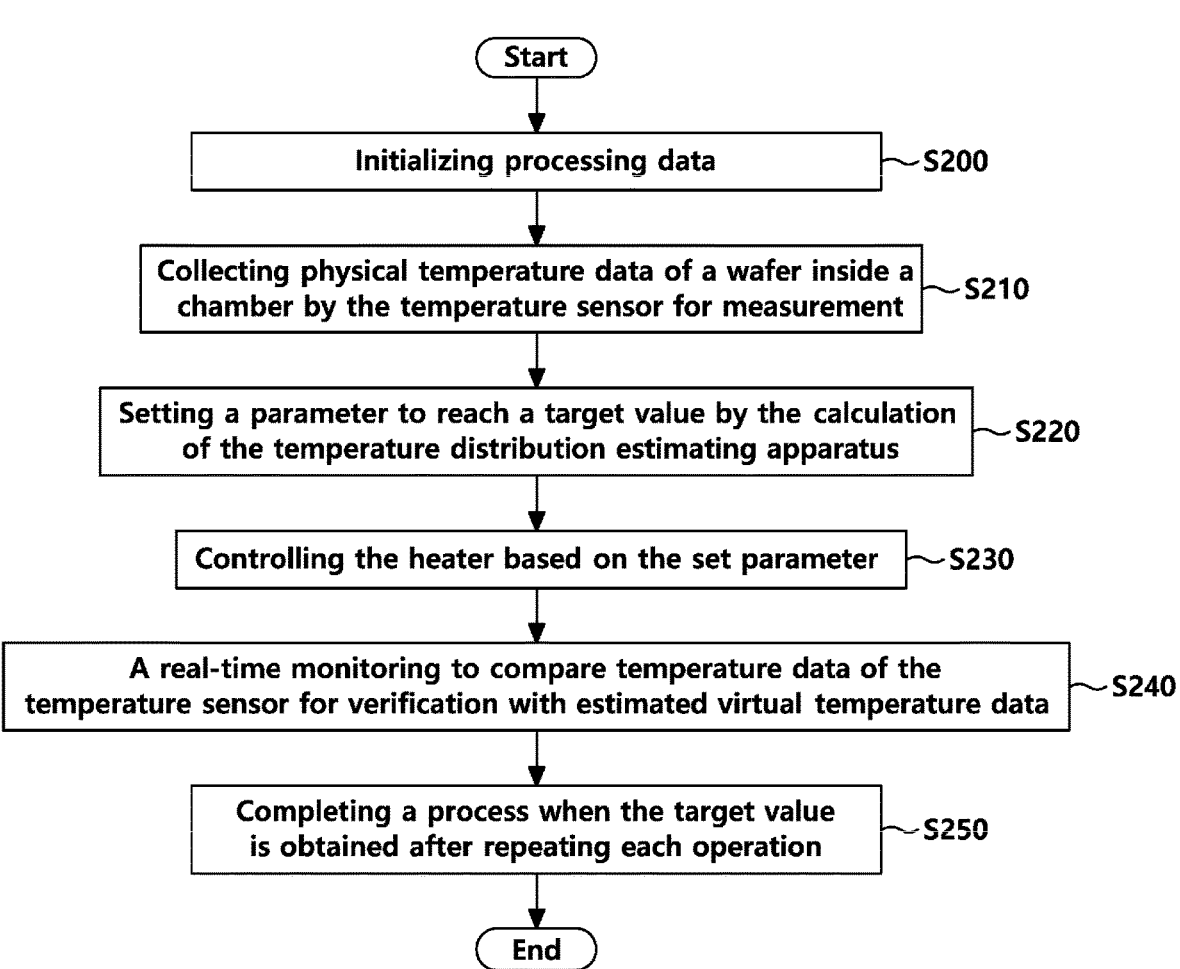
FIG. 4 is the entire flow chart of a rapid thermal processing with using a temperature distribution estimating apparatus according to the disclosure.

Additionally, according to a temperature distribution estimate apparatus of the disclosure, a current state of an apparatus may be observed by the monitoring unit. Specifically, by attaching a temperature sensor for verification on any location, besides the temperature sensor for measurement that is used to estimate a temperature distribution, and by comparing estimated temperature data with temperature data for verification, a current state of an apparatus may be identified. FIG. 4 is the flow chart of a monitoring method with using a temperature distribution estimating apparatus according to the disclosure.

As illustrated in FIG. 4, processing data are initialized first (S200). After that, physical temperature data of a wafer inside a chamber made by the temperature sensor for measurement are collected (S210), and a parameter is set to reach a predetermined target value as described above (S220). The heater controller 140 controls the heater 110 based on the set parameter (S230).

After that, a real-time monitoring is performed to compare temperature data estimated in the same location by using the temperature sensor for measurement 120a with temperature data measured by the temperature sensor for verification 120b (S240). When a target value is obtained after repeating the above operations, a processing is completed (S250).

According to a temperature distribution estimate method and a temperature distribution estimate apparatus of the disclosure, since estimating a temperature distribution is possible by processing point-measured temperature data with using a digital twin technology, a cost for measurement may be reduced because it may be possible to replace multiple temperature sensors. Additionally, temperature distribution information is not only important information to control a heater more precisely, but also a foundation to strictly calculate a temperature uniformity of a substrate. Therefore, it may be possible to obtain a technical effect to improve a quality and yield of a manufactured semiconductor device.

Meanwhile, a temperature distribution estimate method of the disclosure based on a digital twin may be embodied on a computer system. A system composed of one or more computers may be configured to perform each operation of the above-identified method by setting up a software, firmware, hardware, or their combination in a system that makes a system perform operations during working. When one or more computer programs are executed by a data processor, the program may be configured to perform specific operations by including commands that makes a device perform operations.

Meanwhile, a temperature distribution estimate method based on a digital twin described above may be embodied as a program command that may be executed through various computer means and recorded in a computer readable medium. The computer readable medium may include a program command, data file, data structure, etc., or their combination. The program command recorded in the medium may be specifically configured and designed for the disclosure, or it may be one that is notified and usable to an operator of computer software. Examples of the computer readable medium include a magnetic media such as a hard disk, floppy disk, and a magnetic disk, an optical media such as CD-ROM and DVD, a magneto-optical media such as a floptical disk, and a hardware device such as ROM, RAM, and flash memory, etc. that is specifically configured to save and execute a program command. Examples of the program command may include not only a machine language code made by a complier, but also a high-level language code that may be executed by a computer with using an interpreter, etc. The above-identified hardware device may be configured to be operated as one or more software modules to perform an operation of the disclosure, and a reversed situation may be also possible.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A temperature distribution controlling method, performed by a temperature distribution estimating apparatus to measure a temperature distribution of a thermal processing target substrate, comprising: a building operation to build a virtual numerical model for a form and thermal behavior of the thermal processing target substrate using any one of a finite element method, a finite difference method, and a boundary element method as a numerical analysis method; a setting operation to set a regularization parameter a based on number and positions of temperature sensors, thermal diffusivity of the thermal processing target substrate, and performance of a chamber; a generating operation to generate a sensitivity coefficient matrix for sensor positions $$X_t^{A+1}$$

to estimate a heat source received by the thermal processing target substrate from a plurality of heaters, as expressed by following equation:

$$X_s^{i+1} = \frac{\partial T_s^{i+1}}{\partial q} = \begin{bmatrix} \frac{\partial T_1^{i+1}}{\partial q_1} & \frac{\partial T_1^{i+1}}{\partial q_2} & \cdots & \frac{\partial T_1^{i+1}}{\partial q_M} \\ \frac{\partial T_2^{i+1}}{\partial q_1} & \frac{\partial T_2^{i+1}}{\partial q_2} & \cdots & \frac{\partial T_2^{i+1}}{\partial q_M} \\ \vdots & \vdots & \ddots & \vdots \\ \frac{\partial T_N^{i+1}}{\partial q_1} & \frac{\partial T_N^{i+1}}{\partial q_2} & \cdots & \frac{\partial T_N^{i+1}}{\partial q_M} \end{bmatrix}$$

$$X_s^{i+1} = \frac{\partial T_s^{i+1}}{\partial q} = \begin{bmatrix} \frac{\partial T_1^{i+1}}{\partial q_1} & \frac{\partial T_1^{i+1}}{\partial q_2} & \cdots & \frac{\partial T_1^{i+1}}{\partial q_M} \\ \frac{\partial T_2^{i+1}}{\partial q_1} & \frac{\partial T_2^{i+1}}{\partial q_2} & \cdots & \frac{\partial T_2^{i+1}}{\partial q_M} \\ \vdots & \vdots & \ddots & \vdots \\ \frac{\partial T_N^{i+1}}{\partial q_1} & \frac{\partial T_N^{i+1}}{\partial q_2} & \cdots & \frac{\partial T_N^{i+1}}{\partial q_M} \end{bmatrix}$$

where N corresponds to number of sensors used and M corresponds to number of spatially discretized heaters; wherein the heat source and an entire temperature distribution are calculated according to following equations:

$$\Delta t = t^{i+1} - t^i, \Delta q^{i+1} = \left[ (X_s^{i+1})^T (X_s^{i+1}) + \alpha I \right]^{-1} (X_s^{i+1})^T (Y^{i+1} - \overline{T}_s^{i+1}),$$

$$q^{i+1} = q^i + \Delta q^{i+1}, T^{i+1} = T^i + X^{i+1}\Delta q^{i+1}$$

where $t^i$ represents a past time, $t^{i+1}$ represents a current time, $\Delta t$ represents an interval of measurement, $q^{i+1}$ represents an estimated heat source vector, $Y^{i-1}$ a represents a measured temperature vector, $T^{i+1}$ represents an estimated entire temperature vector, including temperatures of other points where there is no temperature sensor, and 'E represents a virtual temperature vector at locations provided with the temperature sensors when $$T_s^a$$

is consistently heated by $q^i$, wherein, when only one temperature sensor is provided, the virtual temperature vector becomes a constant, a condensing operation to condense the sensitivity coefficient matrix into a condensed sensitivity coefficient matrix, based on power ratio information respectively input to the heaters calculated by a heater controller, as expressed by following equations $$X_s^{i+1} = \left[ X_{s1}^{i+1} X_{s2}^{i+1} \cdots X_{sM}^{i+1} \right], \bar{X}_s^{i+1} = \frac{q_1}{q_1}X_{s1}^{i+1} + \frac{q_2}{q_1} + \frac{q_M}{q_1}X_{sM}^{i+1},$$

$$X_s^{i+1} = \left[ X_{s1}^{i+1} X_{s2}^{i+1} \cdots X_{sM}^{i+1} \right], \bar{X}_s^{i+1} = \frac{q_1}{q_1}X_{s1}^{i+1} + \frac{q_2}{q_1}X_{s2}^{i+1} + \cdots + \frac{q_M}{q_1}X_{sM}^{i+1},$$

where $$X_s^{t+1}$$

represents a sensitivity coefficient vector condensed using power ratios; and an estimating operation to, when predetermined temperature data are input, estimate an entire temperature distribution of the thermal processing target substrate based on the virtual numerical model, the regularization parameter, and the condensed sensitivity coefficient matrix by calculating heat sources of at least one of the plurality of heaters and restoring remaining heat sources based on the condensed sensitivity coefficient matrix;

Controlling the heat sources of the plurality of heaters based on the estimated entire temperature distribution so that the temperature distribution of the thermal processing target substrate becomes uniform, to prevent warpage, cracks, or dislocations in the thermal processing target substrate.

2. The temperature distribution estimating method of claim 1, further comprising:

a monitoring operation to compare an entire temperature distribution estimated by using the predetermined temperature data that are measured in the temperature sensor with temperature data measured by using a temperature sensor for in real time to determine current status of an apparatus.

3. The temperature distribution estimating method of claim 1, wherein the setting operation comprises:

collecting temperature information of the thermal processing target substrate according to time during one cycle of processing in an initial apparatus manufacturing process;

converting the collected temperature information into filtered data from which noise is removed by post-processing filtering; and setting a regularization parameter a to a value at which a least square error of the filtered data is minimized by varying the regularization parameter in following equations:

$$\Delta t = t^{i+1} - t^i, \Delta q^{i+1} = \left[ (X_s^{i+1})^T (X_s^{i+1}) + \alpha I \right]^{-1} (X_s^{i+1})^T (Y^{i+1} - \overline{T}_s^{i+1}),$$

$$q^{i+1} = q^i + \Delta q^{i+1}, T^{i+1} = T^i + X^{i+1}\Delta q^{i+1}$$

where $t^i$ refers to a past time, $t^{i+1}$ refers to a present time, $\Delta t$ refers to an interval of measurement, $q^{i+}$ refers to an estimated heat source vector, $Y^{i+1}$ refers to a measured temperature vector, and $T^{i+1}$ refers to an estimated entire temperature vector, including temperatures of other points where there is no temperature sensor, and $$\bar{T}_s^{i+1}$$

refers to a virtual temperature vector of a point having a temperature sensor when $$T_s^i$$

is consistently heated by $q^i$.

4. A temperature distribution controlling apparatus, comprising: a plurality of heaters to supply a heat source to a thermal processing target substrate; a temperature sensor to measure temperatures of the thermal processing target substrate that is changed by the plurality of heaters; and a calculator to estimate an entire temperature distribution of the thermal processing target substrate when predetermined temperature data are input from the temperature sensor, wherein the calculator comprises: a numerical model builder to build a virtual numerical model for a form and thermal behavior of the thermal processing target substrate using any one of a finite element method, a finite difference method, and a boundary element method as a numerical analysis method; a parameter setter to set a regularization parameter a based on number and positions of temperature sensors, thermal diffusivity of the thermal processing target substrate, and performance of a chamber; a matrix generator to generate a sensitivity coefficient matrix to estimate a heat source received by the thermal processing target substrate from the plurality of heaters and to condense the sensitivity coefficient matrix based on power ratios information respectively input into the heaters calculated by a heater controller; and an estimator to, when predetermined temperature data are input, estimate an entire temperature distribution of the thermal processing target substrate based on the virtual numerical model, the regularization parameter, and the condensed sensitivity coefficient matrix by calculating heat sources of at least one of the plurality of heaters and restoring remaining heat sources based on the condensed sensitivity coefficient matrix;

controlling the heat sources of the plurality of heaters based on the estimated entire temperature distribution so that the temperature distribution of the thermal processing target substrate becomes uniform, to prevent warpage, cracks, or dislocations in the thermal processing target substrate, wherein the sensitivity coefficient matrix $$X_s^{t+1}$$

is:

$$\frac{\partial T_s^{i+1}}{\partial q} = \begin{bmatrix} \frac{\partial T_1^{i+1}}{\partial q_1} & \frac{\partial T_1^{i+1}}{\partial q_2} & \cdots & \frac{\partial T_1^{i+1}}{\partial q_M} \\ \frac{\partial T_2^{i+1}}{\partial q_1} & \frac{\partial T_2^{i+1}}{\partial q_2} & \cdots & \frac{\partial T_2^{i+1}}{\partial q_M} \\ \vdots & \vdots & \ddots & \vdots \\ \frac{\partial T_N^{i+1}}{\partial q_1} & \frac{\partial T_N^{i+1}}{\partial q_2} & \cdots & \frac{\partial T_N^{i+1}}{\partial q_M} \end{bmatrix}_{rat}$$

$$\frac{\partial T_s^{i+1}}{\partial q} = \begin{bmatrix} \frac{\partial T_1^{i+1}}{\partial q_1} & \frac{\partial T_1^{i+1}}{\partial q_2} & \cdots & \frac{\partial T_1^{i+1}}{\partial q_M} \\ \frac{\partial T_2^{i+1}}{\partial q_1} & \frac{\partial T_2^{i+1}}{\partial q_2} & \cdots & \frac{\partial T_2^{i+1}}{\partial q_M} \\ \vdots & \vdots & \ddots & \vdots \\ \frac{\partial T_N^{i+1}}{\partial q_1} & \frac{\partial T_N^{i+1}}{\partial q_2} & \cdots & \frac{\partial T_N^{i+1}}{\partial q_M} \end{bmatrix},$$

and the condensed sensitivity coefficient matrix is:

$$X_s^{i+1} = \left[ X_{s1}^{i+1} X_{s2}^{i+1} \ \dots \ X_{sM}^{i+1} \right], \ \tilde{X}_s^{i+1} = \frac{q_1}{q_1} X_{s1}^{i+1} + \frac{q_2}{q_1} X_{s2}^{i+1} + \dots + \frac{q_M}{q_1} X_{sM}^{i+1},$$

$$X_s^{i+1} = \left[ X_{s1}^{i+1} X_{s2}^{i+1} \ \dots \ X_{sM}^{i+1} \right], \ \tilde{X}_s^{i+1} = \frac{q_1}{q_1} X_{s1}^{i+1} + \frac{q_2}{q_1} X_{s2}^{i+1} + \dots + \frac{q_M}{q_1} X_{sM}^{i+1},$$

where N corresponds to number of sensors used and M corresponds to number of spatially discretized heaters, and $$X_s^{t+1}$$

represents a sensitivity coefficient vector condensed using power ratios, wherein the heat source and the entire temperature distribution are calculated according to following equations $$g^s, \ T_s^{t+1} Y_{z+1}^{t+1} \Delta t s^{t+1} t^s$$

where $t^i$ represents a past time, $t^{i+1}$ represents a current time, $\Delta t$ represents an interval of measurement, $q^{i+}$ represents an estimated heat source vector, $Y^{i+1}$ represents a measured temperature vector, $T^{i+1}$ represents an estimated entire temperature vector, including temperatures of other points where there is no temperature sensor, and T'" represents a virtual temperature vector at locations provided with the temperature sensors when '
is consistently heated by $q^1$, wherein, when only one temperature sensor is provided, the virtual temperature vector becomes a constant.

5. The temperature distribution estimating apparatus of claim 4,
　　wherein the temperature sensor comprises a temperature sensor for measurement and a temperature sensor for verification,
　　wherein a monitor is further included to compare an entire temperature distribution estimated by using the predetermined temperature data that are measured in the temperature sensor for measurement with temperature data measured by using the temperature sensor for verification in real time to determine current status of an apparatus.

6. The temperature distribution estimating apparatus of claim 4, wherein the parameter setter is configured to collect temperature information of the thermal processing target substrate according to time during one cycle of processing in an initial apparatus manufacturing process, convert the collected temperature information into filtered data from which noise is removed by post-processing filtering; and set a regularization parameter $\alpha$ to a value at which a least square error of the filtered data is minimized by varying the regularization parameter in following equations:

$$\Delta t = t^{i+1} - t^i, \ \Delta q^{i+1} = \left[ \left( X_s^{i+1} \right)^T \left( X_s^{i+1} \right) + \alpha I \right]^{-1} \left( X_s^{i+1} \right)^T \left( Y^{i+1} - \overline{T}_s^{i+1} \right),$$

$$q^{i+1} = q^i + \Delta q^{i+1}, \ T^{i+1} = T^i + X^{i+1} \Delta q^{i+1}$$

where $t^1$ refers to a past time, $t^{i+1}$ refers to a present time, $\Delta t$ refers to an interval of measurement, $q^{i+1}$ refers to an estimated heat source vector, $Y^{i+1}$ refers to a measured temperature vector, and $T^{i+1}$ refers to an estimated entire temperature vector, including temperatures of other points where there is no temperature sensor, and $$\overline{T}_s^{i+1}$$

refers to a virtual temperature vector of a point having a temperature sensor when $$T_s^i$$

is consistently heated by $q^i$.

* * * * *